(12) United States Patent
Marra, III et al.

(10) Patent No.: US 6,762,580 B1
(45) Date of Patent: Jul. 13, 2004

(54) ELECTRIC MOTOR VELOCITY CONTROLLER

(75) Inventors: Michael Anthony Marra, III, Lexington, KY (US); Randall David Mayo, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 94 days.

(21) Appl. No.: 09/931,434

(22) Filed: Aug. 16, 2001

(51) Int. Cl.[7] ................................................ G05B 9/02
(52) U.S. Cl. .................... 318/563; 318/599; 318/615
(58) Field of Search ............................ 318/563, 565, 318/599, 609, 615–618

(56) References Cited

U.S. PATENT DOCUMENTS

| | | |
|---|---|---|
| 4,172,990 A | 10/1979 | Everett et al. |
| 4,292,640 A | 9/1981 | Lammers et al. |
| 4,401,931 A | 8/1983 | Kulterman et al. |
| 4,577,497 A | 3/1986 | Ray et al. |
| 4,686,437 A | 8/1987 | Langley et al. |
| 4,703,238 A | 10/1987 | Palmin et al. |
| 4,749,927 A | 6/1988 | Rodal et al. |
| 4,851,754 A | 7/1989 | Sakamoto et al. |
| 4,864,490 A | 9/1989 | Nomoto et al. |
| 4,894,598 A | 1/1990 | Daggett |
| 4,950,967 A | 8/1990 | Sakamoto et al. |
| 5,006,770 A | 4/1991 | Sakamoto et al. |
| 5,093,609 A | 3/1992 | Sakamoto et al. |
| 5,214,576 A | 5/1993 | Tani et al. |
| 5,272,428 A | 12/1993 | Spiegel et al. |
| 5,325,460 A | 6/1994 | Yamada et al. |
| 5,479,567 A | 12/1995 | Shinmura et al. |
| 5,585,709 A | 12/1996 | Jansen et al. |
| 5,652,485 A * | 7/1997 | Spiegel et al. ............... 318/147 |
| 5,663,626 A | 9/1997 | D'Angelo et al. |
| 5,666,014 A | 9/1997 | Chen |
| 5,666,034 A | 9/1997 | Seoung et al. |
| 5,726,877 A | 3/1998 | Antoszkiewicz et al. |
| 5,729,113 A | 3/1998 | Jansen et al. |
| 5,773,938 A | 6/1998 | Seong et al. |
| 5,949,210 A | 9/1999 | Gataric et al. |
| 5,963,393 A | 10/1999 | Rowan et al. |
| 5,982,117 A | 11/1999 | Taylor et al. |
| 5,995,737 A | 11/1999 | Bonissone et al. |
| 5,999,361 A | 12/1999 | Kim |
| 6,008,618 A | 12/1999 | Bose et al. |
| 6,014,006 A | 1/2000 | Stuntz et al. |

* cited by examiner

Primary Examiner—Marlon Fletcher
(74) Attorney, Agent, or Firm—Russel O. Primeaux

(57) ABSTRACT

A device for controlling the velocity of an electric motor is provided. The device combines a traditional PI (Proportional+Integral) velocity controller with a robust mapping technique that estimates the velocity of the motor. The mapping technique is based on fuzzy logic methods, and provides a robust estimate of the motor's rotational velocity by using the motor current measurement and pulse-width modulated (PWM) voltage being applied to the motor. In one embodiment the device is combined with a calibration technique which ensures the proper calibration of the motor.

8 Claims, 8 Drawing Sheets

ELECTRIC MOTOR VELOCITY CONTROLLER

TECHNICAL FIELD

This invention relates, generally, to controllers for electric motors, and more specifically, to controllers for electric motors used in printers.

BACKGROUND ART

Computer printers use a variety of motors to actuate pumps, move components, and perform many other functions. In one type of configuration, a Pulse Width Modulated (PWM) signal is supplied to a DC motor. The DC motor may be used, for example, to power a mechanism which primes and purges a printer head. In such an application the mechanism will have a well-defined travel path and pre-set hard stops.

With these conditions, it is important that the PWM signal is sufficient so that the motor moves the mechanism to its various stops. However, if the PWM signal is too strong the motor can move the mechanism too quickly. These movements can cause ink to be thrown from the mechanism or can cause damage to the mechanism or other components.

To control the speed of motors one can employ a proportional integral controller which uses a feedback system based on the motor speed. However, the sensors used to detect the speed can be expensive and can add to the sophistication of the overall system. In low-cost applications these sensors can also create a degree of velocity control and position control which is beyond the requirements of the application. In the printer priming station application one is concerned about the motor velocity being in a proper range. However, precise velocity control and precise position control are not as great a concern as they might be in other applications.

Developments in fuzzy logic can allow feedback decisions to be made in systems by using reference signals which relate to the values being controlled. However, there is a need for the use of fuzzy logic in motor velocity control in a way which is simple and efficient.

To implement the necessary velocity control, it is also desirable to have proper calibration. Ideally, the calibration technique, like the velocity control method, should be simple and inexpensive. This is particularly true for applications which employ inexpensive motor designs such as 3-pole DC motors.

What is needed for the printer priming station and other similar applications is a velocity controller which will provide sufficient velocity control to keep the motor within a range so as to prevent undesirable consequences, but which is simple and relatively inexpensive.

DISCLOSURE OF INVENTION

It is an object of the present invention to provide a velocity controller for electric motors which maintains the motor within an acceptable velocity tolerance.

It is another object of the present invention to provide a velocity controller which is simple.

It is another object of the present invention to provide a velocity controller which is inexpensive.

It is another object of the present invention to provide a velocity controller which avoids the use of optical or other sophisticated sensors.

It is another object of the present invention to provide a velocity controller which operates properly in the presence of measurement noise, motor variations, and load variations.

A device for controlling the velocity of an electric motor is provided. The device combines a traditional PI (Proportional+Integral) velocity controller with a robust mapping technique that estimates the velocity of the motor. The mapping technique is based on fuzzy logic methods, and provides a robust estimate of the motor's rotational velocity by using the motor current measurement and pulse-width modulated (PWM) voltage being applied to the motor.

An advantage of the invention is that it eliminates the need for optical or other more complicated velocity sensors.

A further advantage of the invention is that it provides adequate control of electric motor velocity in a simple way with relatively low cost.

A further advantage of the invention is that it operates properly in the presence of measurement noise, motor variations, and load variations.

These and other objects, advantages, and features of this invention will be apparent from the following description.

BRIEF DESCRIPTION OF THE DRAWINGS

FIG. 2 depicts the priming station with the cap carriage in the rest position.

FIG. 3 depicts the priming station with the cap carriage in the prime position.

FIG. 4 depicts the priming station with the cap carriage in an intermediate traveling position.

FIG. 5 depicts the priming station with the cap carriage in the blot position.

BEST MODE FOR CARRYING OUT THE INVENTION

Figure 1:
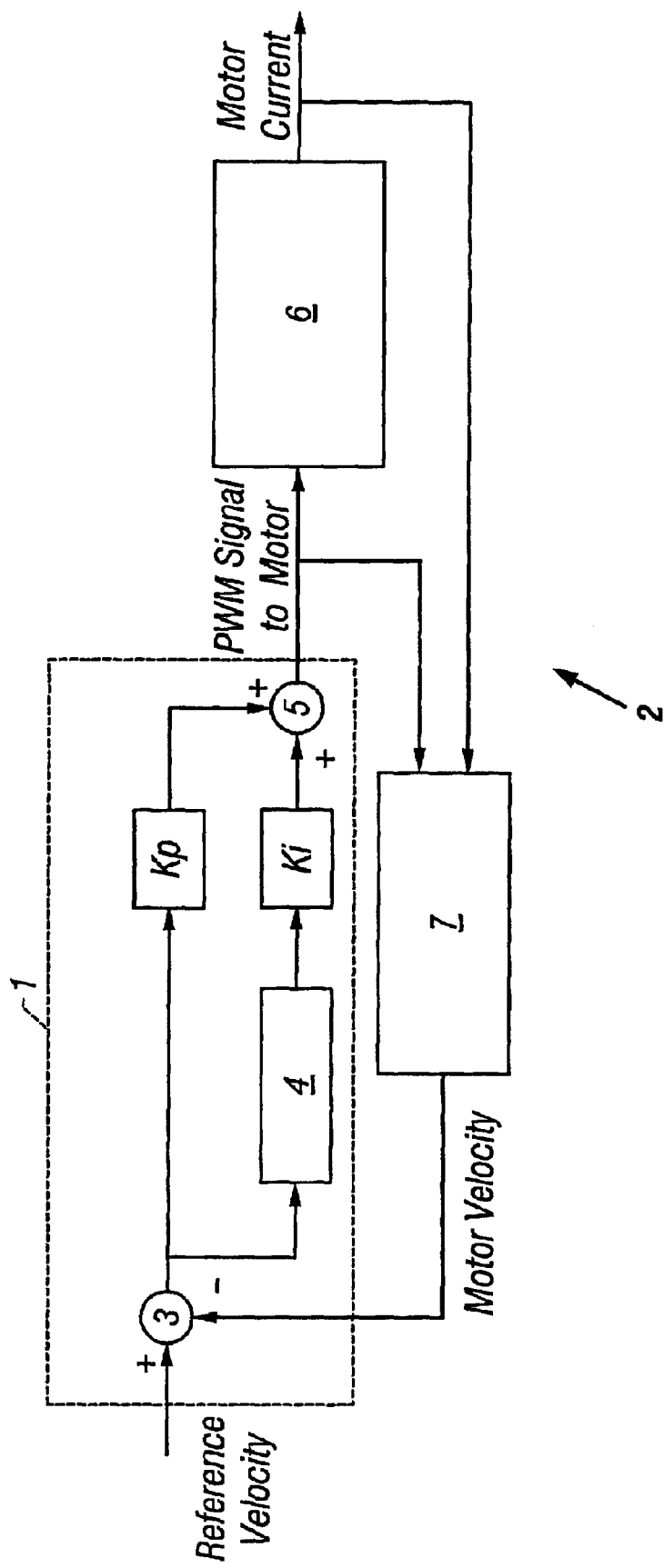
FIG. 1 is a schematic diagram showing a preferred embodiment of the invention.

A preferred embodiment of the invention, velocity controller 2, is shown in FIG. 1. Proportional integral controller 1 (PI Controller) includes initial summing junction 3, integrator 4, and final summing junction 5. A reference velocity signal is fed to initial summing junction 3. The reference velocity is that velocity which is desired for the motor being controlled. A signal representing the estimated motor velocity is also fed to initial summing junction 3.

Initial summing junction 3 compares the reference velocity signal and estimated velocity signal and generates an error signal. The error signal is fed to integrator 4 and is also multiplied by proportional constant Kp. Integrator 4 adds the error signal to its register and generates a signal which is multiplied by integrator constant Ki. The signals generated after multiplication by Kp and Ki are summed at final summing junction 5.

The signal generated by final summing junction 5 is a Pulse Width Modulated (PWM) signal which is then fed to the motor being controlled. The motor can be any one of several types of motors for many applications. In the embodiment depicted in FIG. 1, the motor being controlled is priming station motor 6. Such priming stations are used to prime and purge the print head in computer printers.

When motor 6 receives the signal from final summing junction 5, motor 6 is energized. As those skilled in the art will know, the PWM signal to motor 6 is an on—off signal. In one embodiment the signal is 5% on 95% off at a certain frequency. The current in motor 6 is measured by a series resistor and the use of capacitance as well, although those skilled in the art can use other measurement techniques. Additionally, the measurement of the current is done in such a way as to obtain an average of the current due to the PWM signal. Otherwise the on-off nature of the PWM signal could lead to erroneous sampling.

The PWM signal generated at final summing junction 5 and the motor current measured at motor 6 are both fed to estimator 7. Estimator 7 uses fuzzy logic techniques to estimate the actual motor velocity based on the PWM signal leaving final summing junction S and the motor current measured at motor 6. In a preferred embodiment, velocity estimator 7 is implemented using triangular-based membership functions for the fuzzy input variables (motor current and the PWM signal), and a complete set of fuzzy rules to identify the fuzzy mapping to the output variable (estimated velocity). The signal generated by estimator 7 representing the estimated motor velocity is then fed back to initial summing junction 3 to complete the control process.

The following is an example of the how the controller would operate. The values used in this example are chosen for ease of computation and are not necessarily representative values. Assume that Kp is 0.5 and Ki is 0.1. Suppose that the motor velocity as estimated by estimator 7 is 60 and the reference velocity is 100. Initial summing junction 3 generates an error signal of +40. Integrator 4 is initially set at zero; therefore, after multiplication by Kp and Ki, the signals fed to final summing junction 5 are 20 [40×0.5] and 4 [40×0.1]. Therefore the PWM signal to motor 6 is 24, which corresponds to a 24% duty cycle.

Suppose that after this cycle estimator 7 estimates the motor velocity as 80. Initial summing junction 3 generates an error signal of +20. Integrator 4 is now set at 40; therefore, after multiplication by Ki, the signal fed to final summing junction 5 from the integrator is 6 [(40+20)×0.1]. The signal fed to final summing junction 5 from the Kp side of the controller is 10 [20×0.5]. Therefore the PWM signal to motor 6 is 16, which corresponds to a 16% duty cycle.

The equations used within velocity controller 2 are biased to show zero velocity as a negative value. This biasing guarantees that velocity controller 2 will detect a stop even with slight variations in motor parameters. Therefore, velocity controller 2 will respond accordingly to maintain motion of cap carriage 13 until it reaches one of the hard stop locations, and velocity controller 2 will also detect when cap carriage 13 has reached a hard stop location.

The invention is implemented using an ASIC (Application Specific Integrated Circuit) with an analog to digital converter. Such devices are available commercially using an ARM (Advanced RISC Machines) processor. The programming of the equations used for the PI controller and the fuzzy logic estimator were written in C and a compiler was used to translate the program into ARM language.

Motor 6 in the printer embodiment is a small DC motor. In a preferred embodiment motor 6 will have the following physical properties and performance specifications. For the preferred motor described below, 5V will correspond to about 40% PWM.

Figure 2:
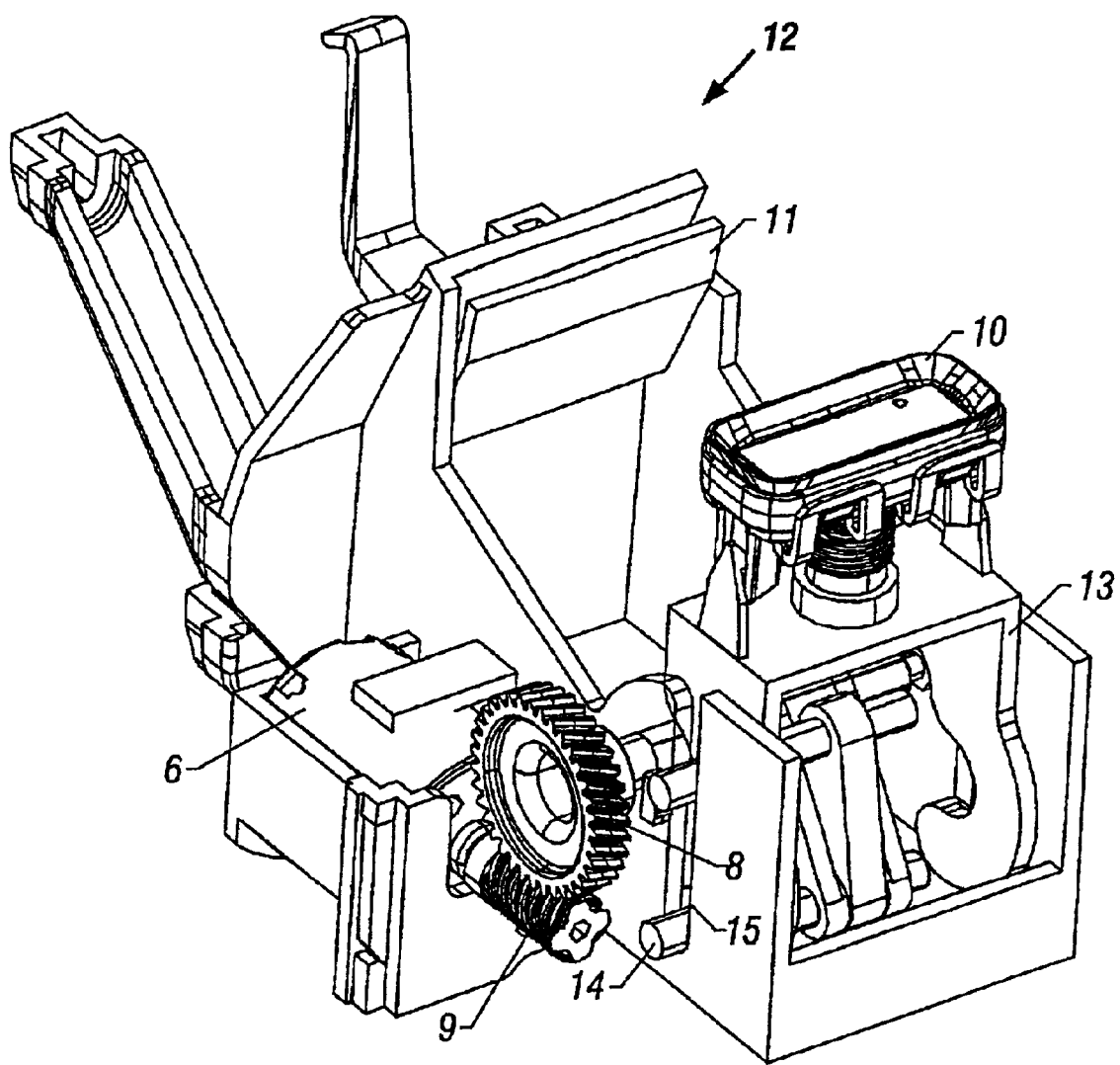
FIGS. 2–5 are perspective views which show the invention as embodied in the priming station of a printer.

Physical properties
housing diameter: 15.5 mm
housing length: 18.6 mm
3 pole
Performance Specs @5 V
no load speed: 10,000 rpm
no load current: 0.045 A
stall torque: 19.5 g-cm With reference to FIGS. 2 through 5, a particular embodiment of the invention will now be described. Although the embodiment depicted in FIGS. 2 through 5 is an adaptation of velocity controller 2 to a particular printer application, those skilled in the art will find velocity controller 2 useful and adaptable to a variety of applications. FIG. 2 depicts priming station 12 which will include motor 6, helical gear 8, worm gear 9, cap 10, blotter stop 11, and cap carriage 13.

In FIG. 2 priming station 12 is shown with cap carriage 13 in the rest position. In the rest position the print head (not shown) for the printer will be able to move freely into a position above cap 10 without making contact between cap 10 and the print head. When a priming operation is needed, the print head will move into a position just above cap 10 as shown in the rest position (FIG. 2). Motor 6 will then be brought to the desired velocity using velocity controller 2. As motor 6 is energized it will turn worm gear 9 which will then translate its motion to helical hear 8. As helical gear 8 turns it will use a system of shafts, cams, and cam guides to move cap carriage 13.

Figure 3:
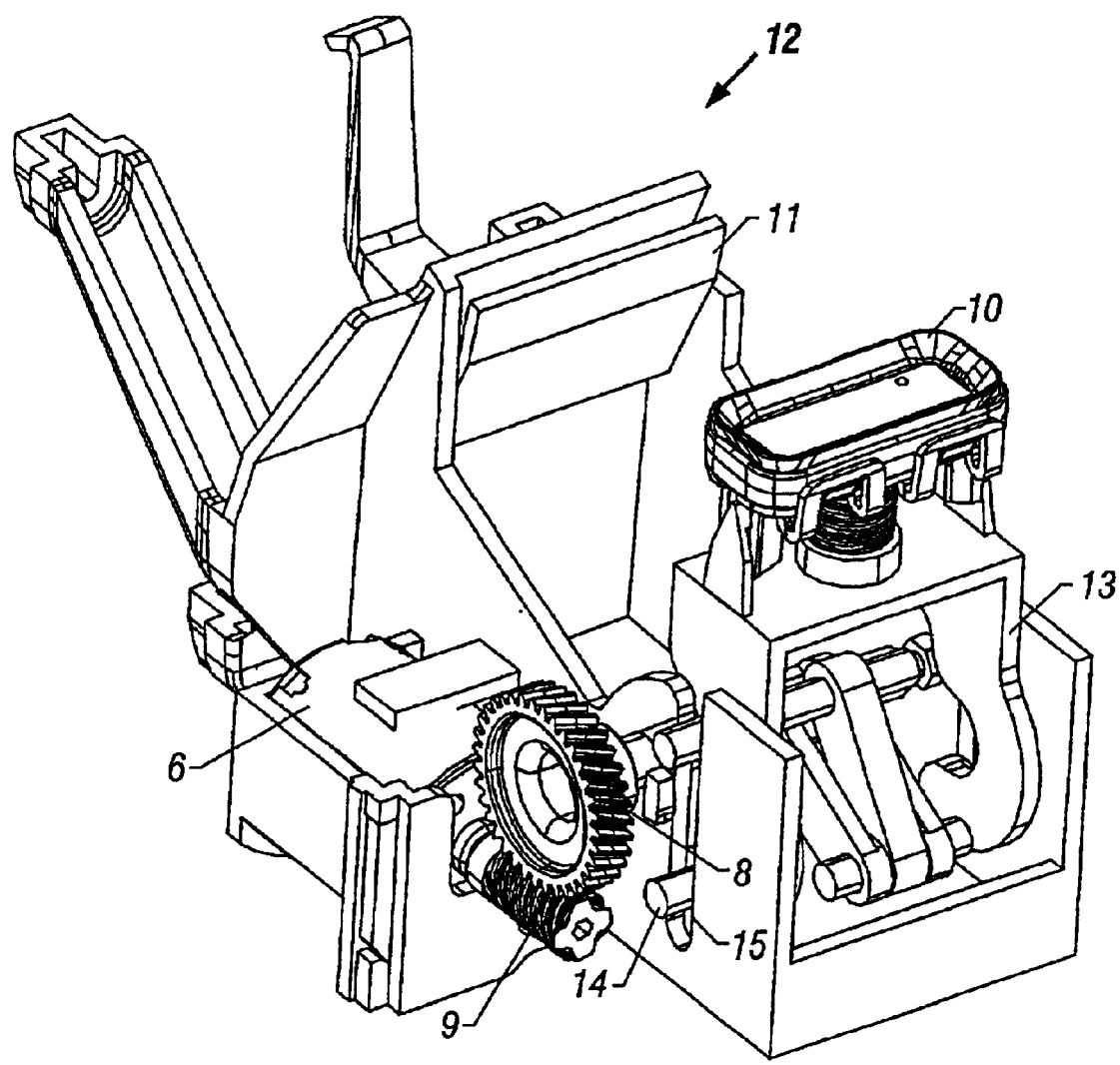

The shafts, cams, and cam guides of cap carriage 13 are designed so that the initial movement of cap 10 is vertical. The vertical movement continues until cap 10 comes into direct contact with the print head, a position designated as the prime position. As previously discussed, the equations for velocity controller 2 are selected so that motor 6 will de-energize when cap 10 reaches a hard stop. The prime position for cap 10 and cap carriage 13 is shown in FIG. 3.

Once the priming operation is complete, motor 6 is again energized to the desired velocity and cap 10 is moved back into the rest position of FIG. 2. As cap 10 moves downward, pins 14 (only one is shown) reach the closed ends of channels 15 (only one is shown) and bring cap carriage 13 to a stop. Once cap 10 is back in the rest position the print head can now be moved out of the path of cap carriage 13.

Cap 10 is made of a flexible material such as rubber. After priming some ink typically remains on cap 10. If this residual ink on cap 10 is allowed to dry, cap 10 may have dry ink buildup and will be unable to achieve sufficient sealing for subsequent priming operations. Therefore it is necessary to remove the residual ink by blotting cap 10 against a blotting surface.

Figure 5:
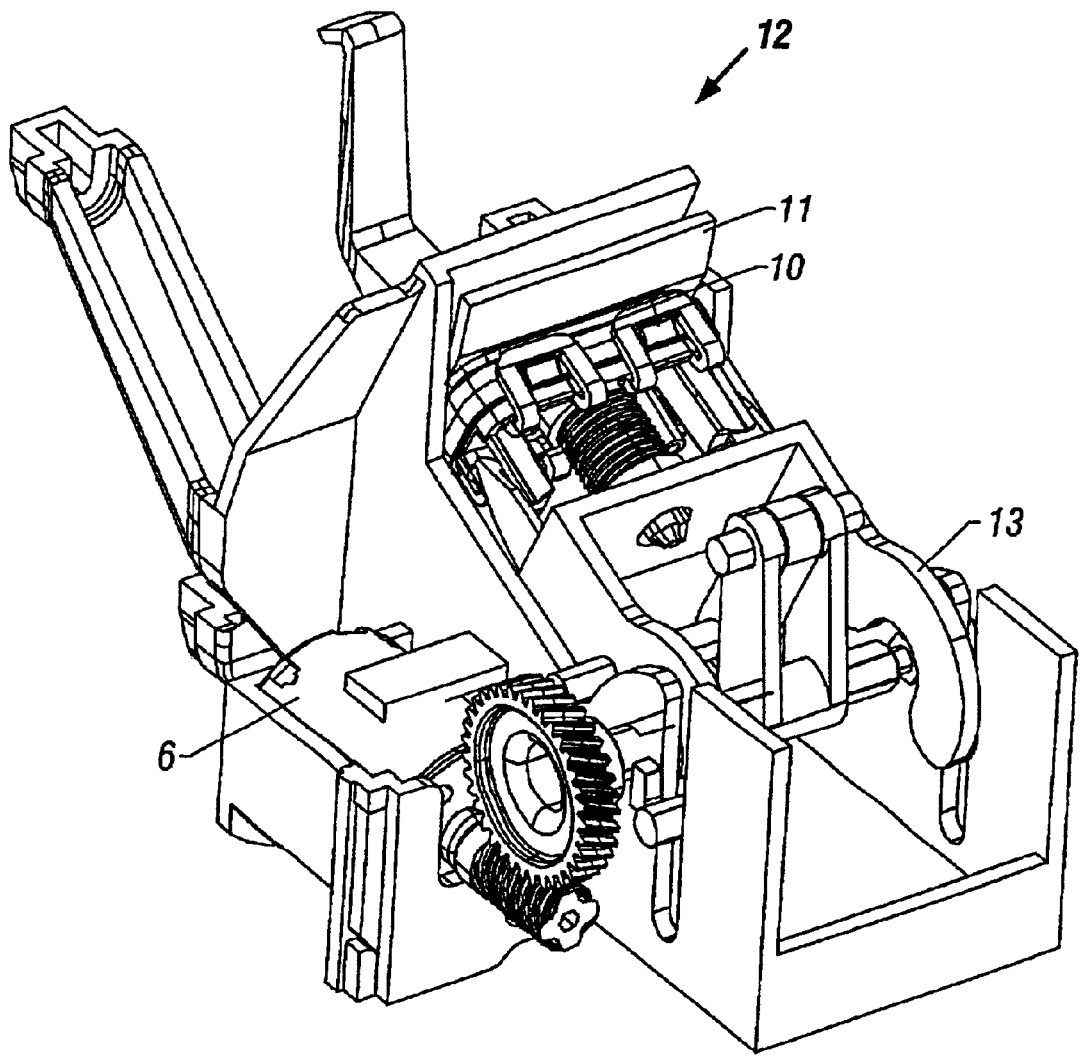

With the print head out of the way, motor 6 can be energized again so as to move cap carriage 13 to the blot position. The blot position, shown in FIG. 5, is the position in which cap 10 is pushed against blotter 11. Blotter 11 can be blotting paper or foam or any other material suitable for blotting known to those skilled in that art. No position control of motor 6 is required. Once energized, motor 6 will move cap carriage 13 through the prime position shown in FIG. 3 until cap carriage 13 reaches the blot position shown in FIG. 5.

Figure 4:
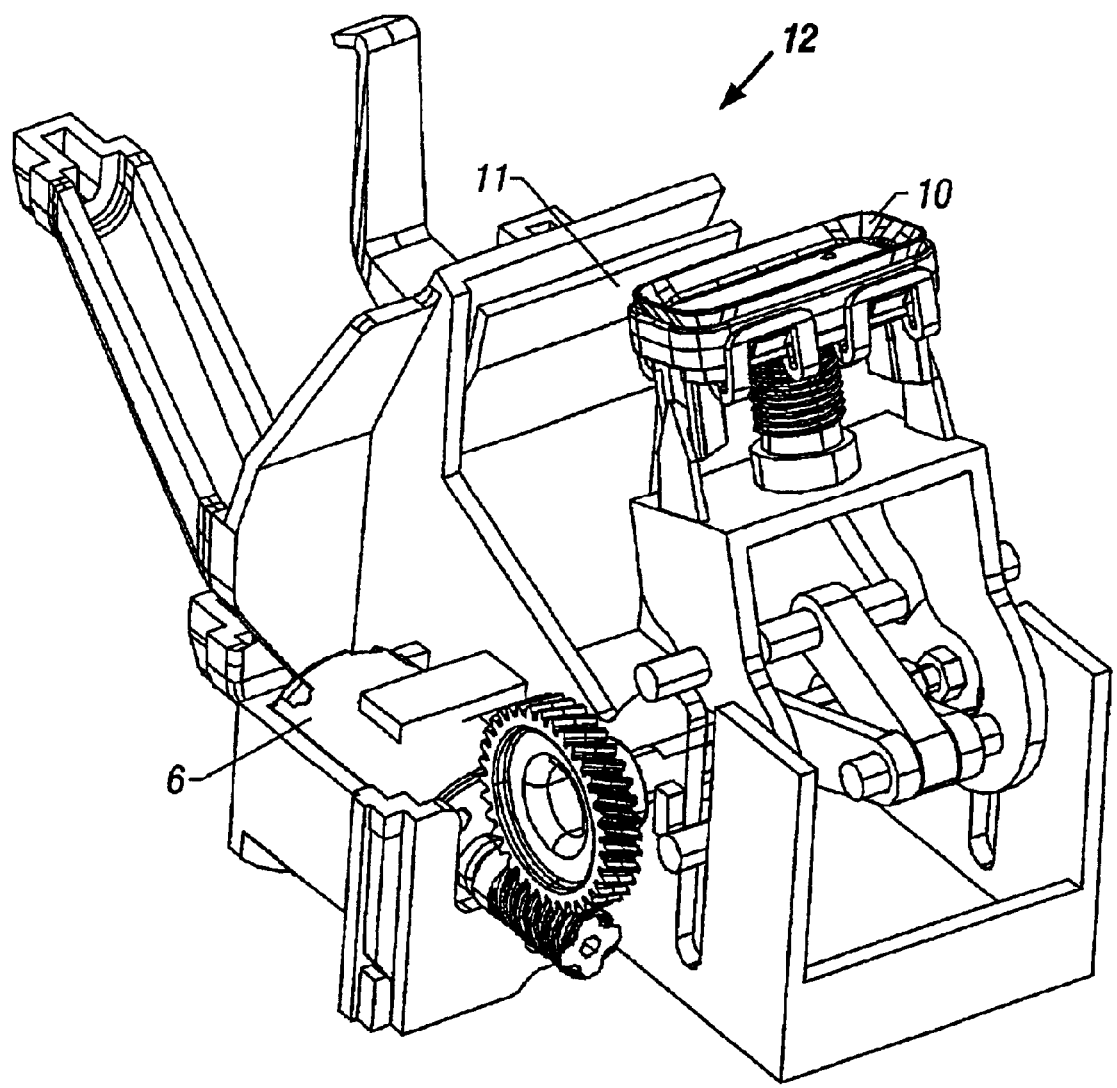

FIG. 4 depicts an intermediate position of cap carriage 13 along its path of travel. The position depicted in FIG. 4 is shown only for understanding of the invention and is not a position in which cap carriage 13 will actually stop. In FIG.

4 cap carriage 13 is shown in a position which is between the blot position and the prime position. After cap 10 has been blotted, cap carriage 13 is moved back to the rest position of FIG. 2.

The priming station application is a good demonstration of an application for which velocity controller 2 is particularly suited. For priming station 12 one is not concerned with position control because preset hard stops will control the position of cap carriage 13. However, one is concerned with velocity control. Too slow of a motor velocity either will not sufficiently energize motor 6 so as to move cap carriage 13 or will cause cap carriage 13 to move too slow and interfere with the movement of the print head.

One is also concerned with a velocity for motor 6 which is too great. If the velocity of motor 6 is too great, ink can be thrown from cap 10 onto the other printer parts or, in a more troublesome scenario, onto the paper being printed.

In a particularly preferred embodiment of this invention, velocity controller 2 will be implemented with an improved calibration method for motor 6. The improved motor calibration method will now be described.

A common way to determine the velocity at which a motor is operating is to measure the back emf in the motor. Using the simple relationship of Ohms Law, the back emf can be determined through measuring the current in the motor. This current measurement is combined with the known resistance of the motor armature and known voltage being applied to the motor to obtain the back emf and hence the motor velocity. For inexpensive motors, this resistance varies from motor to motor, as well as with motor temperature.

Certain inexpensive motors, particularly 3-pole DC motors, can exhibit a wide variation in resistance depending on the position of the rotor. This variation is caused when a brush spans two commutator segments, effectively causing no current to flow in one of the windings. Without the use of equipment to sense the position of the rotor, any measurement of the current while the motor is stopped is of dubious value. Therefore, to obtain accurate readings, the current must be measured while the motor is moving.

To arrive at the proper mapping function of estimator 7, in a particularly preferred embodiment the current will be measured with the motor moving at small velocities. Also, due to mechanical and other factors, the PWM versus current curve will include small PWM values to obtain the proper results.

Figure 6:
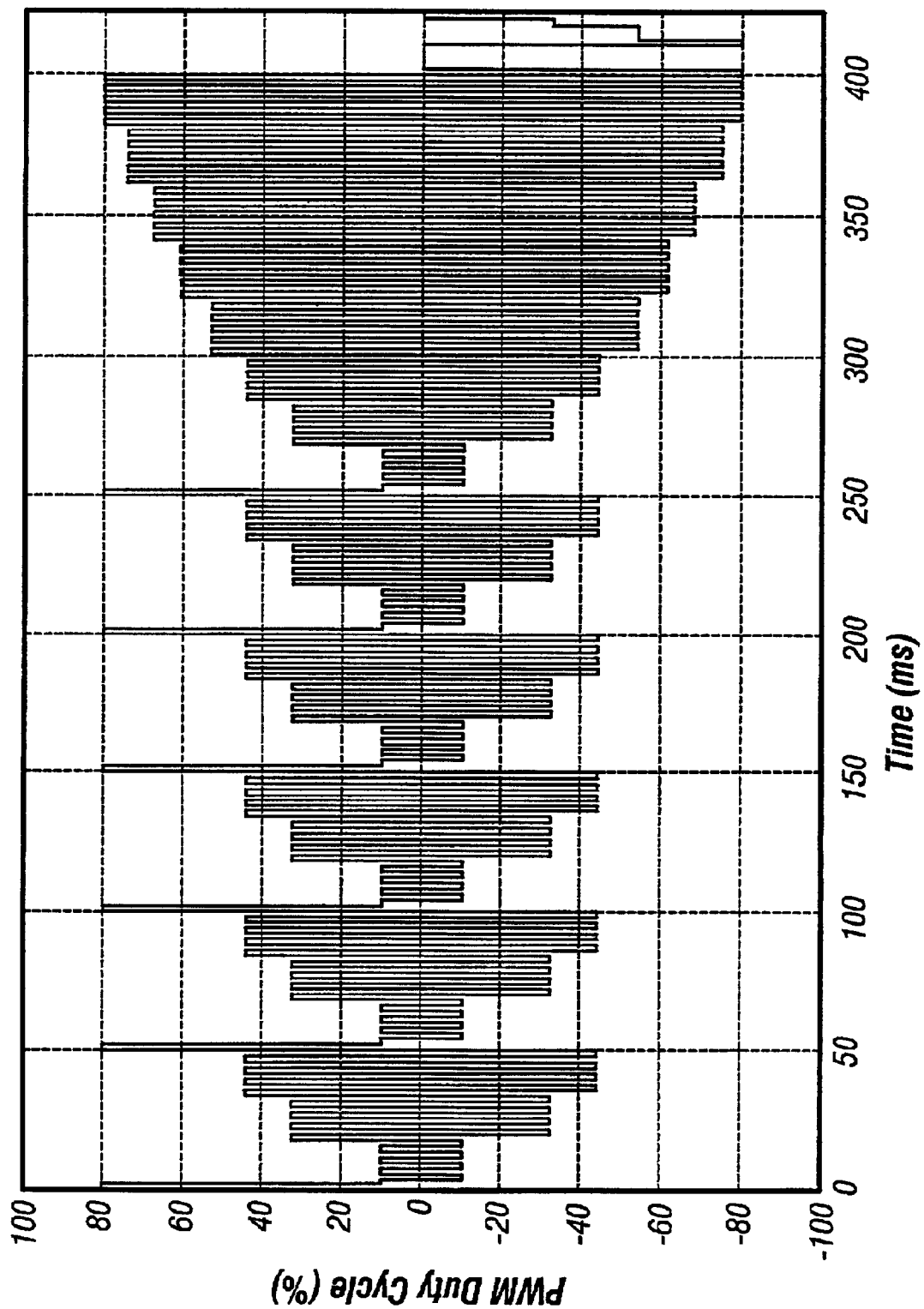
FIG. 6 is a graph showing a complete calibration cycle according to a preferred embodiment of the calibration method aspect of the invention.

FIG. 6 shows a complete calibration cycle according to a preferred embodiment of the invention, which will provide the necessary mapping. First, the PWM duty cycles of interest must be determined. In FIG. 6, the values used are 10%, 32%, 44%, 53%, 61%, 68%, 74%, and 80%. This spread is typical for the invention as it provides sufficient measurements over the range of possible values of the PWM duty cycle. Of particular interest is the small PWM duty cycles, which is where most of the measurements are made.

Starting at time zero, an 80% pulse is given for 2 milliseconds. This is sufficient to guarantee motion of the motor, which is required by the variability in the resistance of the motor at a stopped position. Then, the first three duty cycles are tested, running through each in succession, and repeating five times.

Figure 7:
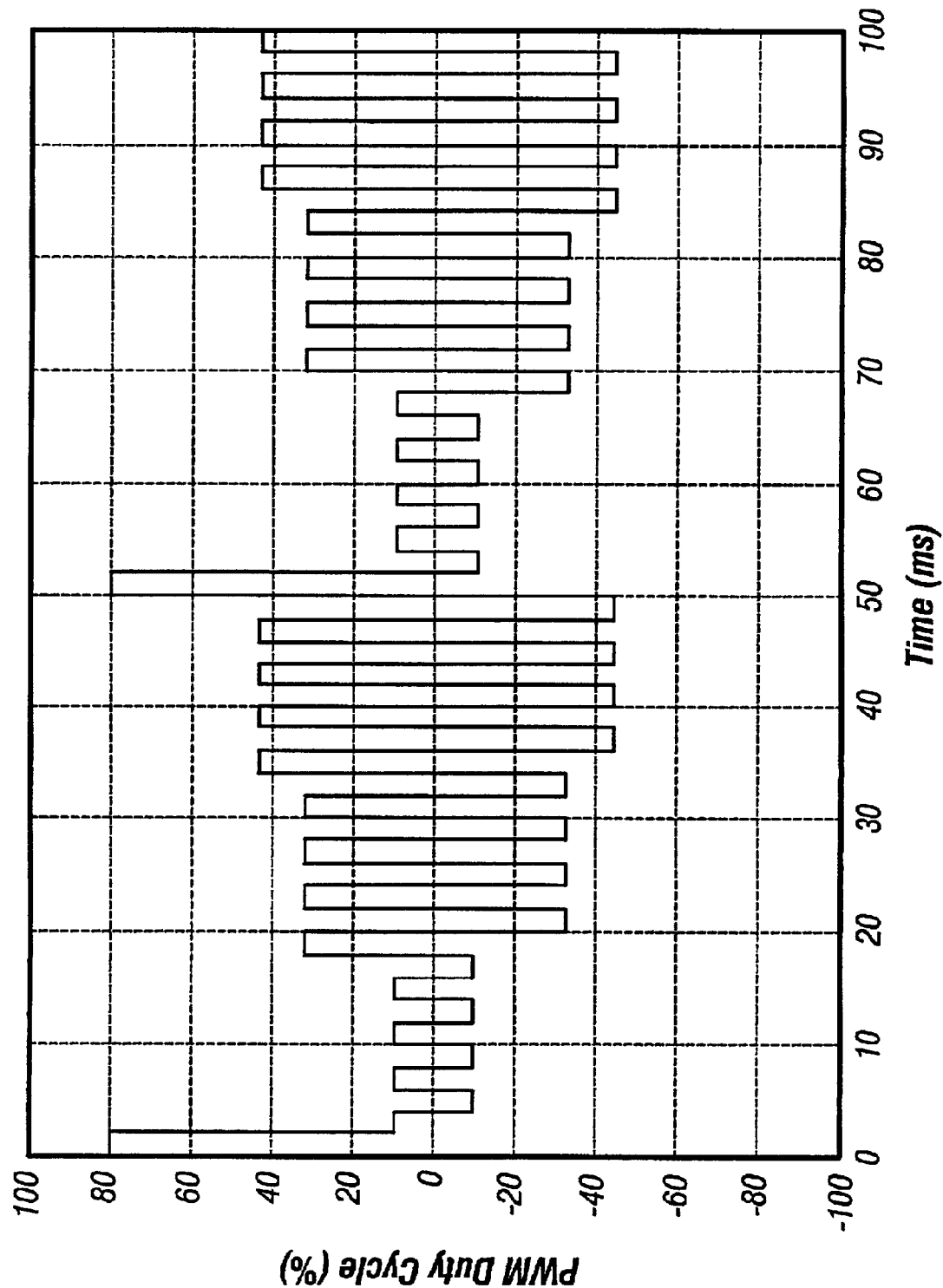
FIG. 7 is a zoomed view of the first two segments of the calibration cycle.

FIG. 7 shows a zoomed view of the first two of five segments where small PWM duty cycles are tested. Following the initial 80% pulse, the first duty cycle of 10% is tested. Eight two-millisecond pulses, alternating between +10% and −10%, are provided, and the current is measured during each.

Following these eight pulses, the next duty cycle is tested. This consists of eight more pulses at 32%, alternating between positive and negative, as before. The current is again measured during each pulse. Then the 44% duty cycle is tested in exactly the same way, taking the appropriate current measurements.

This completes the first segment. The process is repeated four times, with each segment beginning with an 80% pulse to ensure motion of the motor. Thus far in the process, 40 measurements of current will have been made for each duty cycle. This is from each of the eight pulses which is performed five times.

Figure 8:
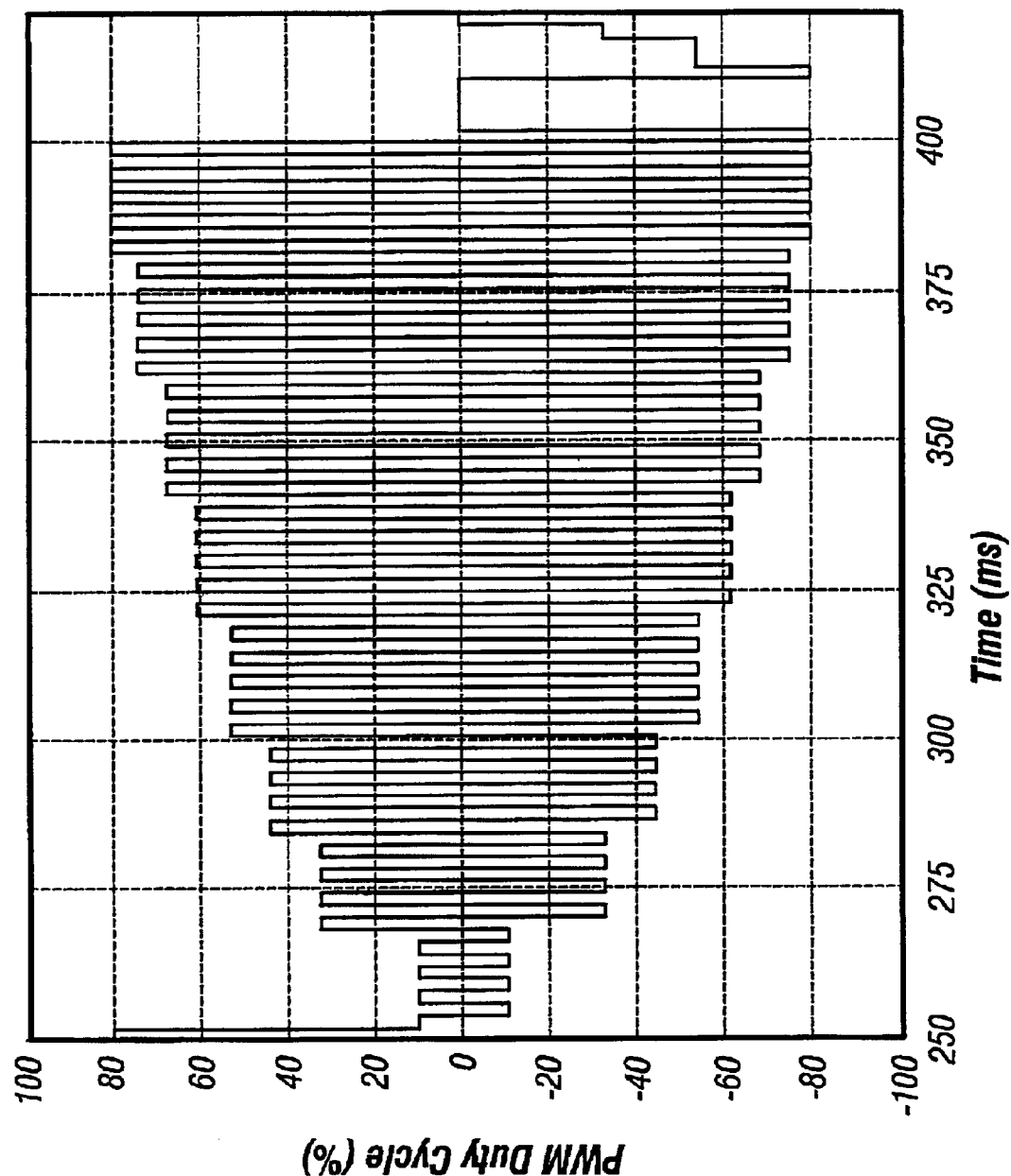
FIG. 8 is a zoomed view of the final segment of the calibration cycle.

Following the first five segments of the calibration cycle, the entire range of PWM duty cycles is tested. This is seen most clearly in FIG. 8, which is a zoomed view of the sixth and final segment. As before, each duty cycle is pulsed eight times, alternating between positive and negative values. The current is measured during each pulse. The last 20 milliseconds of FIG. 8 show a waveform designed to return the motor to its initial stop position, which is desirable but not required.

The current values measured for each duty cycle are summed and stored. The entire calibration routine is then repeated three times. For each duty cycle, this leads to three values for the current sum. The lowest of the three values should be selected as this corresponds most closely to the average current in the motor.

Once the proper current sum is arrived at for each duty cycle, these values are scaled based on the number of measurements taken. Then, by plotting each PWM versus its measured current, the proper mapping function is determined, leading to greatly increased precision of control.

The values for the duty cycles used above are not required, but instead are provided merely by way of example. The use of eight values provides enough PWM versus current pairs to properly determine the mapping function shift. More or fewer values can be used as demanded by an individual application. The pulse width of 2 milliseconds is similarly not required, although it is a preferred embodiment.

After the calibration above has been completed, only a small calibration may be required at the beginning of each motor movement. A sufficiently large PWM, such as 60%, is applied, and the current is measured. This will check for variables such as motor heating. The table entries previously generated are scaled linearly based on this measurement.

There are, of course, other alternate embodiments which are obvious from the foregoing descriptions of the invention, which are intended to be included within the scope of the invention, as defined by the following claims.

What is claimed is:

1. A method for controlling the velocity of a DC electric motor, said motor having an input PWM signal and a motor current, said method comprising the following steps:
   (1) providing said PWM signal and said motor current to an estimator connected to said motor;
   (2) providing a reference velocity and an estimated motor velocity to a controller; and
   (3) calibrating said motor by the following method:
      a) choosing at least one PWM duty cycle value of interest; and
      b) performing a first test wherein the first chosen duty cycle is applied in at least two periods, each of said periods being of opposite polarity from the period preceding it, and the current in said motor is measured during each of said periods.

2. The method of claim 1 wherein said estimator generates an estimated motor velocity using fuzzy logic.

3. The method of claim 1, wherein said controller is a PI controller.

4. The method of claim 3, wherein said PI controller generates a PWM signal based upon said reference velocity and said estimated motor velocity.

5. The method of claim 1, further comprising the additional step of, prior to performing said first test, applying a startup PWM duty cycle of sufficient magnitude to ensure motion of said motor.

6. The method of claim 1, further comprising the additional step of performing a test for each additional chosen PWM duty cycle value of interest, wherein each of said PWM duty cycles is applied in at least two periods, each of said periods being of opposite polarity from the period preceding it, and the current in the motor is measured during each of said periods.

7. The method of claim 1, further comprising the additional step of calculating the apparent resistance of the motor.

8. The method of claim 6, further comprising the additional step of calculating the apparent resistance of the motor.

* * * * *